Nov. 30, 1965  H. GOLDEN  3,220,776
VELOCIPEDE HUB CAP
Filed March 31, 1964
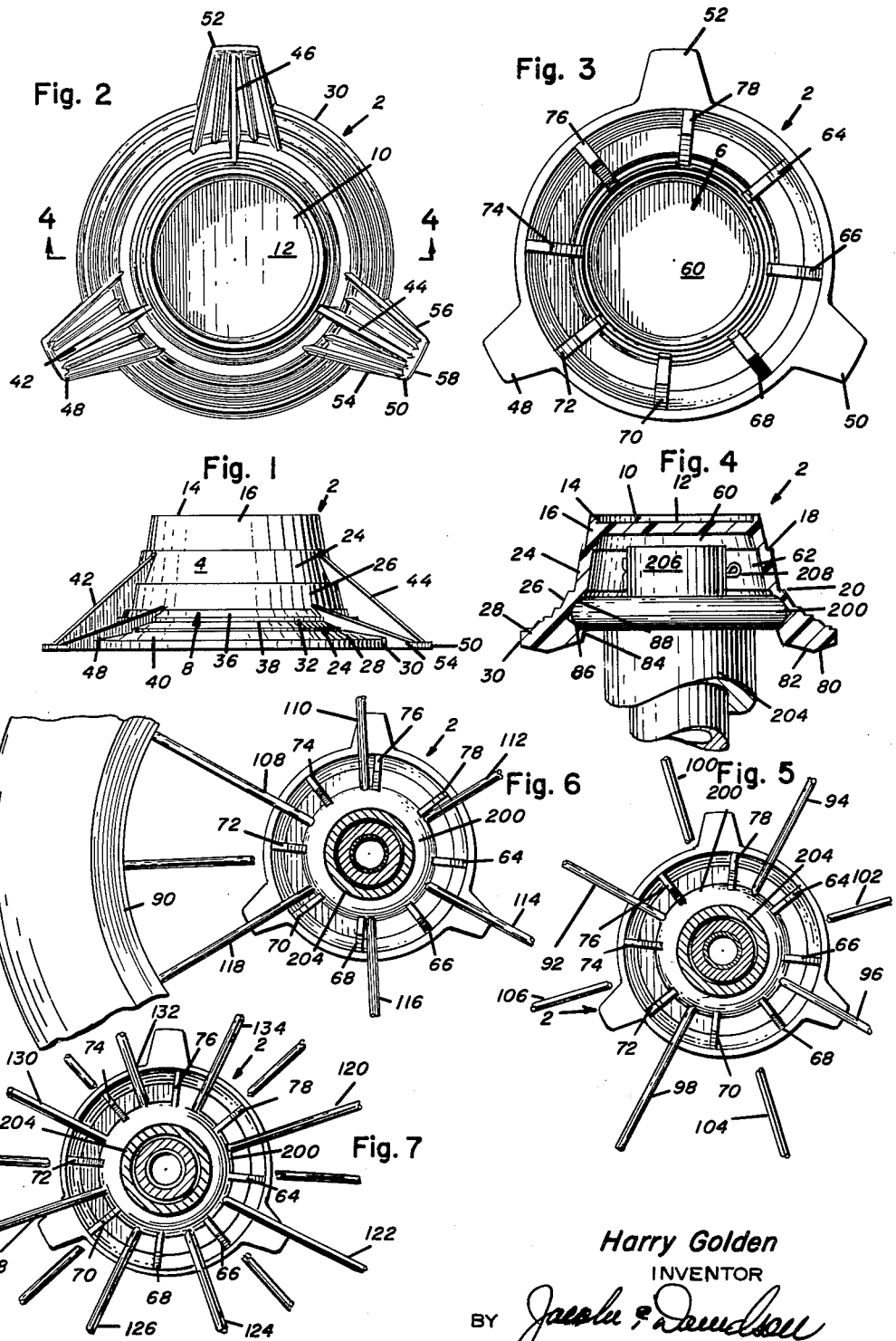
Harry Golden
INVENTOR
BY
ATTORNEYS United States Patent Office 3,220,776
Patented Nov. 30, 1965

1

3,220,776
VELOCIPEDE HUB CAP
Harry Golden, 250 W. 57th St., New York 19, N.Y.
Filed Mar. 31, 1964, Ser. No. 356,095
2 Claims. (Cl. 301—108)

This invention relates to a decorative velocipede hub cap, and is particularly concerned with the provision of a velocipede hub cap which is adapted to frictionally engage the wheel axle hub of a velocipede wheel about the spokes thereon.

The normal wheel construction used with vehicles such as, for example, a tricycle, usually includes an outer wheel support connected to an axle housing by means of a plurality of spokes extending from the peripheral central portion of the underside of the wheel support to the hubs on each side of the axle housing. Usually, an equal number of spokes extend to each side of the axle housing substantially around the periphery of the hub thereon and spaced equally about the internal periphery of the wheel support. In this manner, when the velocipede is supported by a plurality of wheels constructed in accordance herewith, the outer portions or ends of the axles and axle housings are in full view to the user or rider of the velocipede as well as the cotter pin and wheel axle passing through the axle housing. Of course, other types of wheels can be used, but regardless of the type which is used, the ends of the wheel axle housing and wheel axle are commonly unattractive as well as presenting a safety hazard to the child riding the velocipede.

Bearing the above in mind, the present invention has as one of its primary objects the provision of a decorative velocipede hub cap which can be easily fastened on either side of the wheel to enclose the wheel axle housing as well as the end of the wheel axle and the cotter pin attached thereto. Another primary object of the present invention in this regard is the provision of such a hub cap which can be easily fixed in desired ultimate position without requiring any tools, or any special dexterity or manipulating ability.

Another object of the present invention is the provision of a decorative velocipede hub cap which includes a one piece molded member, and more particularly a truncated self-supporting hub cap adapted to be positioned upon the wheel axle hub of a velocipede wheel in an easy and efficient manner.

Aside from the above basic objects of the invention, there are certain equally important but somewhat more specific objects, including:

(a) The provision of a decorative velocipede hub cap as prescribed above, which not only serves to protect the rider from entanglement of his clothes with the axle and cotter pin of the velocipede wheel, but in addition renders the general appearance of the wheel structure more attractive;

(b) The provision of such a velocipede hub cap which can be manufactured inexpensively so as to be available for widespread use;

(c) The provision of such a hub cap which is constructed so that it may frictionally engage both the spokes and hub of the wheel axle housing on either side of the wheels;

(d) The provision of such a hub cap which incorporates a locking feature such that mere pressure on the surface of the hub cap positively locks the same to the hub of the wheel axle housing as well as the spokes connected to the wheel;

(e) The provision of such a hub cap wherein the same is constructed so as to be adapted for use with a wheel having four, six or eight external spokes connected to the wheel rim and wheel hub.

2

In addition the foregoing objects which are directed to the structural and functional aspects of the invention, it should be noted that an important but auxiliary object of the instant invention is to provide a decorative hub cap conforming with the preceding objects, and which includes a single member which can be easily manufactured from plastic materials and through high speed injection molding techniques as to minimize the manufacturing cost.

The invention will be better understood, and objects other than those specifically set forth above, will become apparent when consideration is given to the following detailed description. Such description refers to the annexed drawings presenting a preferred and illustrative embodiment hereof.

In the drawings:

FIGURE 1 is a side view of the decorative velocipede hub cap constructed in accordance herewith;

FIGURE 2 is a top plan view of the hub cap shown in FIGURE 1;

FIGURE 3 is a bottom plan view of the hub cap shown in FIGURE 1;

FIGURE 4 is a sectional side view taken along the line 4—4 of FIGURE 2, FIGURE 4 further showing the engagement of the hub cap with the hub of a velocipede wheel;

FIGURE 5 is a front view partially in section of the hub cap constructed in accordance herewith, and showing the same in frictional engagement with a velocipede wheel;

FIGURE 6 is a front view partially in section of the hub cap constructed in accordance herewith, and showing the same in frictional engagement with another type of velocipede wheel; and FIGURE 7 is a front view partially in section of the hub cap constructed in accordance herewith and showing the same in frictional engagement with another type of velocipede wheel.

If reference is first made to FIGURE 1, it will be noted that the velocipede hub cap shown therein is generally designated by the reference numeral 2. Such hub cap includes a one piece hollow truncated member generally designated by the reference numeral 4 having an internal wheel hub engaging surface generally designated by the reference numeral 6 (FIGURE 3) and an external decorative surface generally designated by the reference numeral 8. It should be understood that although the present description is directed to a single hub cap construction, the same is used in combination with another or a plurality of hub caps for attachment to other wheels on the velocipede. However, for purposes of description, only a single hub cap member is described herein.

If reference is now made to FIGURES 1 and 2, it will be noted that the external decorative surface 8 has a circular recess 10 on the upper or outer portion thereof and includes a base wall 12 and an upstanding circular peripheral wall 14. This peripheral wall 14 is the upper or extending portion of the inclined circular wall 16 disposed at the uppermost part of the truncated member 4. A plurality of circular ridges 18 and 20 are disposed in vertically spaced relation upon the truncated member 4 and are further disposed about the periphery thereof. Integrally formed with the circular ridges is a continuous circular side wall means formed of a plurality of interconnected circular walls 16, 24 and 26, which walls are vertically spaced from one another by the previously described ridges 18 and 20. In this manner, the successive ridges and inclined walls give the appearance of a stepped effect so that when the hub cap is placed in engagement with a wheel, as further described below, it gives the effect or appearance of a rotating or turning movement.

Integrally formed with and extending angularly radially outwardly from the bottom-most inclined wall 26 is an outer inclined circular skirt 28 which terminates at the outer border or ridge 30 on the truncated member 4. As best shown in FIGURE 1, this inclined skirt 28 is provided with a series of vertically spaced ridges 32 and 34 and sloping surfaces 36, 38 and 40. Again, it should be appreciated that these ridges and flat sloping surfaces on the circular inclined skirt 28 further serve to enhance the appearance and effect previously described.

A plurality of upstanding decorative fins 42, 44 and 46 are integrally molded with the external surface of the hub cap and extend outwardly and downwardly therefrom as seen in FIGURE 1. These fins are spaced equally about the external surface so that the circumferential distance between any two adjacent fins and a third fin is substantially equal. In other words, the angular disposition of each fin is approximately 120° from either adjacent fin. Integral with and extending downwardly and outwardly from the external surface of the hub cap, are a plurality of fin supporting members 48, 50 and 52, each of which has a pair of side walls 54 and 56 connected at the lower ends thereof by a front wall 58, extending therebetween. It should be noted that each of the fins 42, 44 and 46, respectively, are integrally molded and connected with at least two of the inclined walls, and more particularly the walls 24 and 26, as well as being integrally molded and formed with the respective fin supports associated therewith.

It should be further noted that the hub cap constructed in accordance herewith is manufactured from a polyolefin composition which includes polyethylene and polypropylene. Such composition has been found to provide for a more efficient manufacture of the hub cap assembly as well as providing a low cost for the manufacture and sale thereof. The hub cap is easily manufactured from these plastic materials, by high speed injection molding techniques, commonly known and conventionally used in the manufacturing industry.

The internal wheel engaging surface 6 as best shown in FIGURES 3 and 4, includes a circular wheel axle recess 60 and an outer bore 62 communicating the wheel axle recess 60 with the bottom portion of the truncated member 4. As best shown in FIGURE 4, the top wall 12 which constitutes the bottom portion of the recess 10 in the top of the hub cap also serves as the enclosure or top member for the wheel axle recess 60.

A plurality of locking members are equally spaced around the periphery of the underside of the inclined circular surface 28. These locking members include the depending projections 64, 66, 68, 70, 72, 74, 76 and 78 integrally molded with and depending from the inclined circular surface. These eight locking members or projections are spaced at an angle of 45° from each adjacent locking member so that equal spacing is provided around the entire periphery of the internal surface of the hub cap.

Each of the locking members or projections 64 through 78 includes an outer sloping surface 80 disposed downwardly and inwardly from the outer edge 30 of the inclined circular surface 28. A first beveled surface 82 extends inwardly from the sloping surface 80 and upwardly therefrom. This beveled surface 82 serves to provide a positioning area for the wheel axle hub 200 to be further described below. A second beveled surface 84 extends inwardly and upwardly from the beveled surface 82 and serves the purpose of guiding the wheel hub 200 and wheel axle toward the wheel axle recess 60 as further described below. A third beveled surface 86 extends upwardly and outwardly from the beveled surface 84 and is connected to the underside 88 of the inclined circular surface 28. It should be here understood that each of the locking members or projections 64 through 78 are constructed in a similar manner, and therefore a description of any individual member should provide adequate understanding of the overall construction of each locking member.

In view of the material from which the one piece velocipede hub cap is constructed from, desired resiliency and flexibility for operation or attachment of the hub cap to a wheel of the types shown in FIGURES 5 through 7 is achieved. As shown in FIGURE 4, a wheel axle housing 204 is provided with a wheel axle hub 200 at each end thereof. A wheel axle 206 having an aperture extending therethrough (not shown) for insertion of a cotter pin 208, passes through the wheel axle housing 204. This wheel axle 206 extends into the wheel axle recess 60 described above when the same is in the assembled position with the hub cap.

Assuming for purposes of description that the hub cap 2 is disengaged from the wheel hub 200, the hub cap would be first placed on the outer surface of the wheel hub 200 and supported thereon by means of the beveled surfaces 82 previously described. Thus, proper alignment of the hub cap with the wheel axle housing and cooperating wheel hub would be accomplished. Further pressure applied to the top of the hub cap would result in the disformation of the locking members 64 through 78 in a manner such that the wheel hub 200 would move over the beveled edges or surfaces 84 for guiding the wheel hub into the bore on the internal portion of the hub cap, placing the wheel axle and cotter pin in the wheel axle recess 60 so that the resulting placement of the hub cap as shown in FIGURE 4 on the wheel hub 200 would result. It should be apparent that the aforementioned disformation of the locking members results from the fact that the diameter of the wheel hub is larger than the diameter across any two opposite locking members. Thus, the locking members because of their flexibility and resiliency afforded by the particular material from which the same are constructed, would positively lock the hub cap on the wheel axle hub by frictionally engaging the same. To remove the hub cap from the wheel hub it would only be necessary to grasp the inner surface of one of the fin supports 48, 50 and 52 and exert an outward pressure thereon for removing the hub cap from the wheel hub.

Attention is now directed to FIGURES 5, 6 and 7, wherein it is shown how the hub cap constructed in accordance with the present invention is adapted for use with a wheel having four, six or eight external spokes which extend from the periphery of the wheel rim 90 (FIGURE 6) to the wheel hub 200.

As stated above, the velocipede hub cap of the present invention is adapted for use with a wheel having an even number of external spokes between four and eight, and which is secured thereto by means of frictional engagement therewith. Accordingly, FIGURE 5 represents the hub cap frictionally engaged with a wheel having four external spokes connected thereto. These spokes are represented by the reference numerals 92, 94, 96 and 98. These spokes extend from the wheel hub 200 outwardly toward the wheel rim (not shown) as do the internal spokes 100, 102, 104 and 106, but these latter spokes engage the wheel hub (not shown) at the other end of the wheel axle housing 204. It should be here noted that each of the external spokes 92 through 98 is disposed between a pair of locking members and substantially equally spaced therebetween. Thus, the frictional engagement between the locking members and the wheel hub 200 serves to positively lock the wheel hub to the hub cap 2.

FIGURE 6 represents an attachment of the hub cap 2 to a wheel assembly including the wheel rim 90 having six external spokes designated by the reference numerals 108, 110, 112, 114, 116 and 118 extending therefrom to the wheel hub 200 which is frictionally secured to the hub cap 2 around the periphery thereof and frictionally engaged with the locking members 64 through 78. Here again, it should be noted that each of the external spokes are disposed between two locking members, but in this case some of the external spokes are substantially equally spaced between adjacent locking members and others are spaced in juxtaposition to the locking members. Thus, by a mere manipulation or turning of the hub cap on the wheel hub 200 it is possible to position the same thereon so that it may be engaged with the wheel hub 200 without any interference from the external spokes 108 through 118.

FIGURE 7 represents the hub cap 2 frictionally engaged with a wheel having eight internal and eight external spokes with the latter attached to the wheel hub 200 which is shown and extending outwardly toward the wheel rim (not shown). In this case, it should be noted that each of the locking members 64 through 78 are equally spaced between each of the external spokes 120 through 134. In other words, the locking members are spaced at angles of 45° from one another while the external spokes of the wheel are also spaced at 45° to one another. However, in order to positively lock the hub cap 2 upon the wheel hub 200 it is necessary to place the same on the hub cap at a position wherein the locking members are out of angular phase with the spokes to an extent of 22½°, which in this case, substantially equally spaces the external spokes between each of the locking members as previously described.

The point to understand with regard to the mounting of the hub cap on the wheel hub itself, is that the locking members on the internal periphery of the hub cap are sufficiently flexible and resilient to permit interengagement of the same with the wheel hub secured to the axle housing.

Although not specifically mentioned above, it will be appreciated that various configurations can be incorporated on the exterior truncated surface of the hub cap about the periphery thereof to give a similar desirable appearance as is created by the peripheral ridges and inclined walls previously described.

Having now described a preferred embodiment hereof in considerable detail, it will be appreciated that the objects set forth at the outset of the present specification have been successfully achieved. Accordingly, what is claimed is:

1. A velocipede hub cap adapted for frictional attachment to a velocipede wheel having a central axle with a hub member thereon and a plurality of spokes radiating therefrom, said hub cap comprising:
   a hollow unitary member fabricated of a polyolefin and having a continuous circular side wall means and an end wall;
   an angularly radially outwardly extending skirt projecting integrally from said side wall means;
   said side wall means, said skirt and said end wall defining recess means within said member;
   a plurality of spaced locking members integrally formed along a major radial portion of the interior of said skirt and projecting into said recess means;
   each of said locking members including a notched portion therein with each of said notched portions being spaced equidistantly from said end wall;
   said notched portions cooperatively serving to define an annular groove means located at the juncture of said skirt and said side wall means and having a given diameter;
   said given diameter being smaller than the diameter of said wheel hub member upon which said member is to be attached;
   said skirt and locking members being resiliently deformable to permit said member to be frictionally engaged upon said wheel hub member with the periphery of said wheel hub member being disposed within said annular groove means;
   said locking members each being disposed between a pair of wheel spokes when said member is frictionally engaged upon said velocipede wheel.

2. A velocipede hub cap as defined in claim 1 wherein said member includes a plurality of spaced ribs upon the exterior thereof to facilitate gripping of said hub cap for selective attachment and removal thereof.

References Cited by the Examiner
UNITED STATES PATENTS

| | | | |
|---|---|---|---|
| 1,878,528 | 9/1932 | Kraeft | 301—108 X |
| 2,952,491 | 9/1960 | Lyon | 301—37 |
| 2,973,226 | 2/1961 | Ellies | 301—37 |
| 3,034,833 | 5/1962 | Ares | 301—37 |
| 3,111,347 | 11/1963 | Miller | 301—108 |

BENJAMIN HERSH, *Primary Examiner.*
ARTHUR L. LA POINT, *Examiner.*
R. J. JOHNSON, *Assistant Examiner.*